United States Patent
Provitola

[19]

[11] Patent Number: 6,119,983
[45] Date of Patent: Sep. 19, 2000

[54] AIRSHIP/SPACECRAFT

[76] Inventor: Anthony Italo Provitola, P.O. Box 2855, DeLand, Fla. 32721-2855

[21] Appl. No.: 09/301,139

[22] Filed: Apr. 28, 1999

[51] Int. Cl.$^7$ ..................................................... B64G 1/00
[52] U.S. Cl. ........................ 244/158 R; 244/172; 244/24; 244/30
[58] Field of Search ............................... 244/158 R, 162, 244/172, 24, 30, 31

[56] References Cited

U.S. PATENT DOCUMENTS

| | | | |
|---|---|---|---|
| 2,996,212 | 8/1961 | O'Sullivan, Jr. ........................... | 244/24 |
| 3,120,932 | 2/1964 | Stahmer ..................................... | 244/24 |
| 4,012,016 | 3/1977 | Davenport ................................. | 244/97 |
| 4,032,085 | 6/1977 | Papst ........................................ | 244/30 |
| 4,119,052 | 10/1978 | Rinaldi ..................................... | 114/264 |
| 4,228,789 | 10/1980 | Shinozuka ................................. | 114/342 |
| 4,730,797 | 3/1988 | Minovitch ................................ | 244/159 |
| 4,773,617 | 9/1988 | McCampbell ............................. | 244/24 |
| 4,850,551 | 7/1989 | Krawetz ................................... | 244/97 |
| 5,005,783 | 4/1991 | Taylor ...................................... | 244/97 |
| 5,012,640 | 5/1991 | Mirville ................................... | 60/246 |
| 5,348,251 | 9/1994 | Ferguson .................................. | 244/30 |
| 5,348,254 | 9/1994 | Nakada .................................... | 244/26 |
| 5,449,129 | 9/1995 | Carlile ..................................... | 244/97 |
| 5,538,203 | 7/1996 | Mellady ................................... | 244/96 |
| 5,713,536 | 2/1998 | Bata ........................................ | 244/96 |
| 5,730,390 | 3/1998 | Plichta .................................... | 244/230 |
| 5,755,402 | 5/1998 | Henry ...................................... | 244/24 |
| 5,842,665 | 12/1998 | McKinney ................................ | 244/2 |
| 5,890,676 | 4/1999 | Coleman .................................. | 244/128 |

*Primary Examiner*—J. Woodrow Eldred

[57] ABSTRACT

An airship/spacecraft, which, in a preferred embodiment, uses its lifting gas as fuel for thrusters, which may be of the turbo-type or rocket type, or both, to achieve transition to space flight. The airship aspect has gas retaining structures that can withstand internal and external pressure and can change in volume and shape. The spacecraft aspect provides control, power, services, and interior space for missions of the airship/spacecraft.

17 Claims, 9 Drawing Sheets

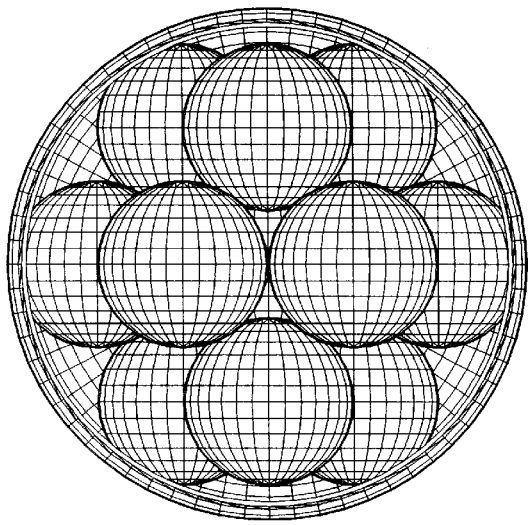
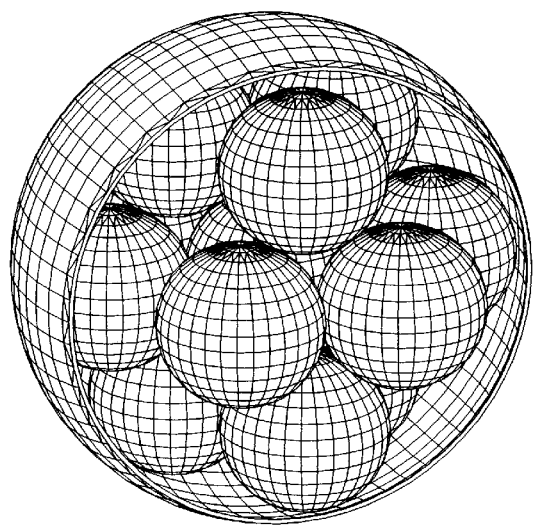
FIG. 5  FIG. 6
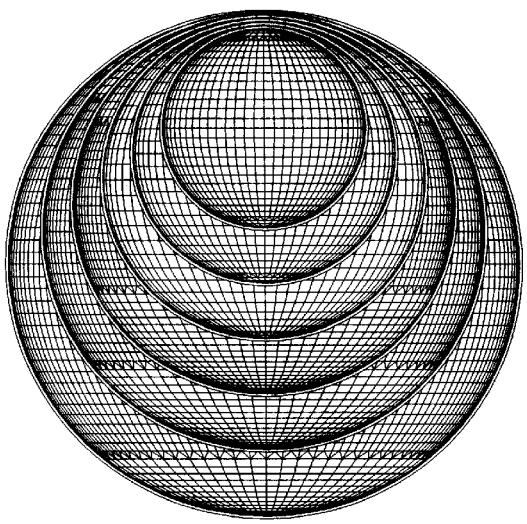
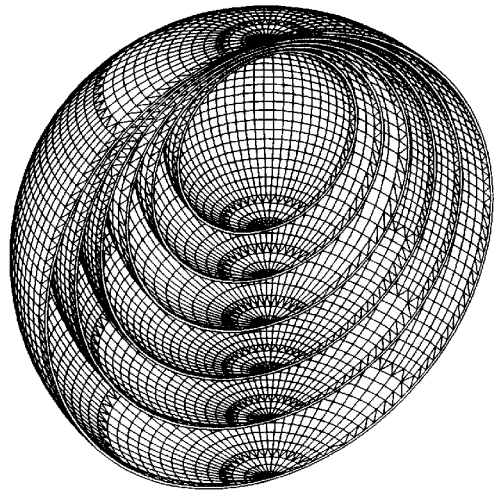
FIG. 7  FIG. 8

AIRSHIP/SPACECRAFT

CROSS-REFERENCE TO RELATED APPLICATIONS

U.S. patent application Ser. Nos. 09/276665, 09/276666, and 09/321,796.

BACKGROUND OF THE INVENTION

The present invention is a combination airship and spacecraft that uses its lifting gas as fuel for thrusters to achieve space flight. The airship aspect operates to provide lift with lifting gas in one or more gas retaining structures that may change in volume. The spacecraft aspect provides control, power, services, and interior space for missions of the airship/spacecraft. An airship/spacecraft may be connected with others to form larger space structures and spacecraft, as shown in FIGS. 16–19.

There is presently a quest for a means to achieve economical heavy lifting into space. Construction of the limited space-station using multiple rocket launches, with assembly by crews manning the U.S. Space Shuttle orbiter, has proven to be expensive and uncertain by reason of the cost and risk. Current space technology, most notably in the United States of America, continues to rely upon conventional rocket configurations to achieve a substantial presence in space. The principal prospect of departure from such reliance exists in the space-plane project currently in the development phase. All such technologies require structures and materials that will withstand high g-forces and temperatures, because all such technologies involve high speed operation with significant atmospheric friction and rapid acceleration and deceleration.

Recent entries in the field are known from U.S. Pat. Nos. 5,730,390 and 5,842,665 in which prior art in space launch technology alternate to conventional rocket powered orbital insertion is discussed. Both of these inventions are for single stage, thruster-driven-rotor, rotor-driven, vertical-take-off spacecraft, and therefore rely upon aerodynamic effects to achieve altitude. The first of these, titled "Reusable Spacecraft", also relies upon the shape of the spacecraft to act as an aerodynamic lifting body to gain altitude under power. That patent claims "a disk-shaped casing configured to generate buoyancy in horizontal travel through a gas atmosphere". Although the term "buoyancy" is used there, it is clear that the concept of aerodynamic lift was intended, because only aerodynamic lift is generated as a result of "horizontal travel through a gas atmosphere". Moreover, the patent does not include as an element of the invention the use of a lifting gas to create "buoyancy", as in the operation of a lighter-than-air-craft. "Buoyancy" as used in the present application means the effect of an object rising in a fluid as a result of relative lightness of the object with respect to the weight of the volume of the fluid the object displaces. Both of the above-referenced inventions require the consumption of fuel to take-off and climb through the atmosphere, with power supplied by thrusters which burn such fuel. Neither of these inventions involve the use of a lighter-than-air system for lifting the spacecraft through the atmosphere, or involve the use of lifting gas as fuel for thrusters or other power generation.

The use of gaseous hydrogen as fuel for turbo-type thrusters is known from U.S. Pat. No. 5,012,640. The Combined Air-Hydrogen Turbo-Rocket Power Plant disclosed in that patent, however, uses evaporating liquid hydrogen to power its compressor to compress air into which gaseous hydrogen is injected for combustion, and does not use its compressor to compress the hydrogen.

That rockets have been carried aloft by balloons and launched from altitude is well known: the balloon was an expendable flexible gas envelope that was discarded upon launch, without a framework structure and without any role in the enhancement of the lifting capacity of the lifting gas except to expand as the pressure of the ambient atmosphere decreases with altitude. The present invention is clearly distinct from such a system. The present invention is an airship and a spacecraft. The present invention may include dynamic gas retaining structures with expandable frameworks which are used to maximize the altitude to which the lifting gas will be effective to lift the airship. The present invention uses the lifting gas as fuel for thrusters which then power on the flight of the entire airship/spacecraft. The present invention provides a single-stage launch vehicle which can use the airship structures as components of space-frames and larger spacecraft.

The present invention has elements that are covered generally by class 244, aeronautics, and may be considered under the following subclasses: 3, compound aeronautical machines; 12.2, circular; 12.3, dual propulsion; 12.4, thrust tilting; 24 miscellaneous aircraft; 29, propelled aeronautical machines; 61, aircraft power plants adapted to use the sustaining gas of an airship as fuel; 97, devices for changing buoyancy of lighter-than-air craft; 125, construction of hull and internal structure of lighter-than-air craft; 126, construction of outer surface of lighter-than-air craft; and, 158, machine or structure designed for travel in the upper reaches of and/or beyond the atmosphere of a celestial body. Also to be considered is class 60, power plants, particularly subclass 246.

BRIEF SUMMARY OF THE INVENTION

The present invention is an airship/spacecraft that uses its lifting gas as fuel for thrusters to achieve transition from airship operation to space flight. Such thrusters may be turbo-type, rocket type, and/or a hybrid of those types. Propeller thrusters may also be used for low altitude stabilization and maneuver.

The lifting component of the airship comprises one or more gas retaining structures which may maintain a lower pressure than exists external to the structure. A gas retaining structure may have its own framework in order to restrict or allow for expansion and contraction. A gas retaining structure may also have a framework which is dynamic, allowing for controlled changes of volume and shape of the framework and redistribution of framework stress. A gas retaining structure may also be compound, that is, comprised of a plurality of other gas retaining structures having one or more of the characteristics described above.

The preferred embodiment places the thrusters on a structure which may include controls, machinery, tanks for fuel and/or oxidizer, and space for crew, passengers, cargo, or equipment, or all of them, which shall be hereinafter referred to as the spacecraft body. The spacecraft body may be separate from but connected to a gas retaining structure, or may be integrated with a gas retaining structure.

Objects of the invention are to provide: an airship which has sufficient buoyancy to rise vertically to an altitude of neutral buoyancy in the region of the stratosphere/ionosphere; an airship/spacecraft which uses its lifting gas as fuel for thrusters to power it to space flight; and, an airship/spacecraft that can descend at planetary destinations from space flight. It is also an object of the invention to reduce g-forces and atmospheric friction heating during ascent and descent.

BRIEF DESCRIPTION OF THE DRAWINGS

FIG. 5 is a diagrammatic side cutaway view of a gas retaining structure containing other separate gas retaining structures.

FIG. 6 is a diagrammatic perspective cutaway view of the gas retaining structure shown in FIG. 5.

FIG. 7 is a diagrammatic side cutaway view of nested gas retaining structures.

FIG. 8 is a diagrammatic perspective cutaway view of the nested gas retaining structures shown in FIG. 7.

DETAILED DESCRIPTION OF THE INVENTION

Figure 1:
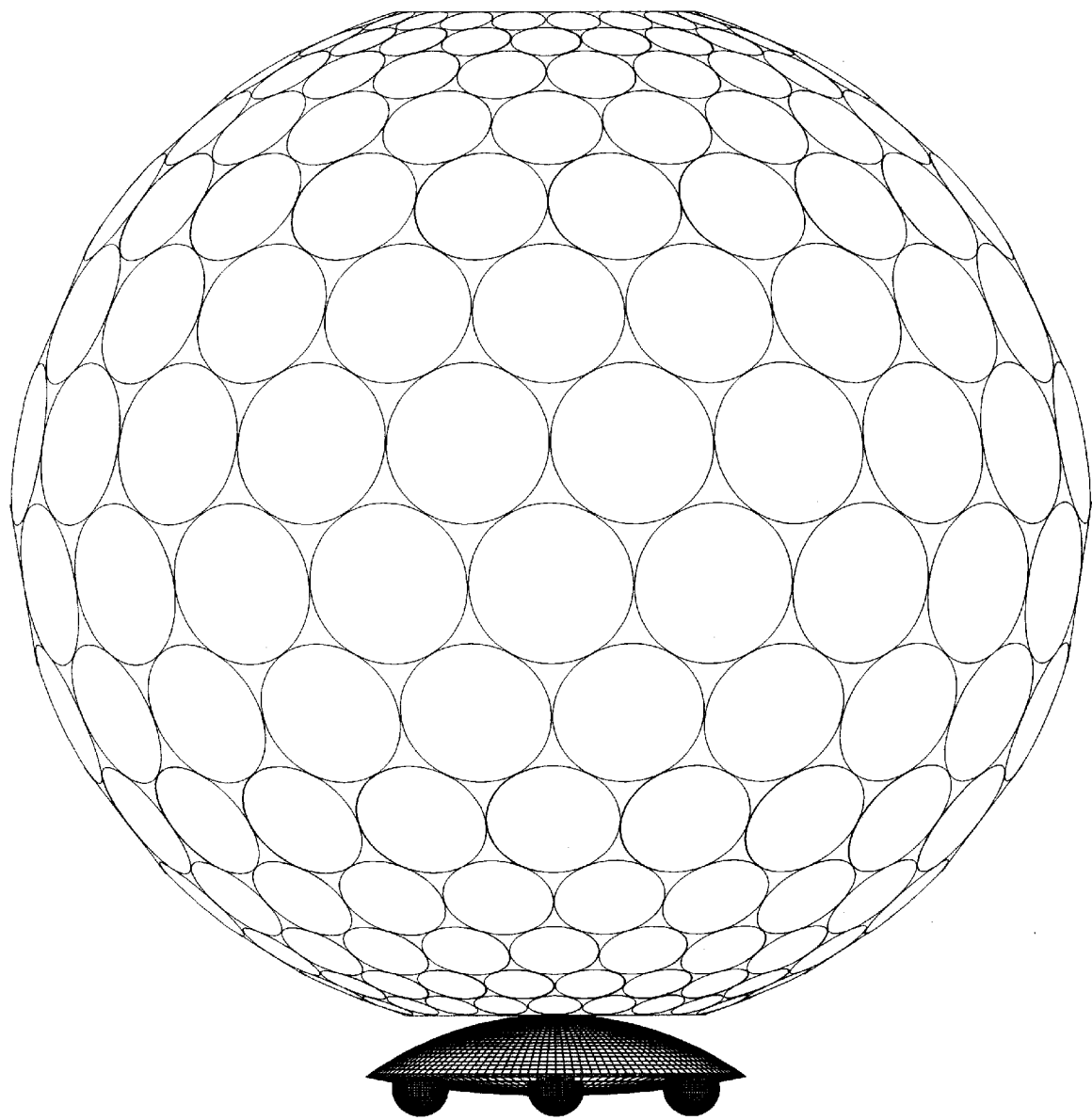
FIG. 1 is a diagrammatic side view of the airship/spacecraft.

The present invention is an airship/spacecraft that uses its lifting gas as fuel for thrusters to achieve transition from airship operation to space flight. Such thrusters may be of the turbo-type, which intake and may compress gaseous oxidizer and/or gaseous fuel; of the rocket type, which use stored oxidizer; and/or hybrids of those types. At least one of the thrusters must be capable of functioning without an atmospheric oxidizer, as in the case of a rocket thruster. Other thrusters may be employed to operate where an atmospheric oxidizer is available, as in the case of an atmospheric turbojet engine. Other types of thruster, such as propeller types, may also be used for low altitude stabilization and maneuver.

The lifting component of the airship is comprised of one or more gas retaining structures, which may be flexible, as in the case of balloons and blimps; semirigid, as in the case of a gas retaining structure that is partially or completely supported by a framework; or rigid, as in the case of dirigibles, in which a framework supports a hull, which itself may be a gas retaining structure, to contain other gas retaining structures, such as flexible gas bags. A gas retaining structure may also be a combination of the types described above.

The airship in the present invention may also have a gas retaining structure with an integrated framework to restrict expansion and contraction or allow for flexion, expansion, and contraction of the structure. An example of such a structure is shown in the diagrammatic view of the airship/spacecraft shown in FIG. 1 in which the framework of the gas retaining structure is constructed of toroidal elements. Such a framework may also be employed in a hull structure that contains gas bags, or be integrated with gas bags. Such a framework may also be dynamic, to effect controlled changes of size and shape of the framework and redistribution of framework stress.

A gas retaining structure may also be comprised of a plurality of other gas retaining structures of one or more of the types described above, hereinafter referred to as a "compound gas retaining structure". Such a compound gas retaining structure is shown in FIGS. 5 and 6, but contained within a larger structure, which can also be a gas retaining structure. The component gas retaining structures of compound gas retaining structures may contain gasses different from one another in chemical composition which are under pressures different from one another, from the environment within a larger containing structure, which may also be a gas retaining structure, and/or from the external environment.

Another kind of compound gas retaining structure is one in which gas retaining structures of various sizes are nested, as shown in FIGS. 7 and 8, in which a plurality of gas retaining structures are constructed so that a gas retaining structure contains another gas retaining structure, and where the containing gas retaining structure itself is contained within another gas retaining structure, and so on. As with others of the compound type different shells of the nested structure may contain different gasses.

A compound gas retaining structure may also function as a pressure vessel. Such a pressure vessel reduces the structural demand on each component gas retaining structure by maintaining a differential in the pressure held between successively contained structures. The pressure contained or withstood by each of the component structures would be reduced to only the pressure differential between the immediately successive component structures, thus permitting lighter construction of the component structures. A compound gas retaining structure also allows for control of the center of mass of the entire structure by altering the density of the gasses contained in the component structures, either by pressure or composition. For example, the system shown in FIGS. 7 and 8 would always maintain an upright orientation in an atmosphere if the density of the gas within the successively smaller nested structures were less than the next larger one. The same would also apply to the system shown in FIGS. 5 and 6 if the density of the gas in the component gas retaining structures is controlled so that the center of mass of the system is below its spatial center.

Figure 2:
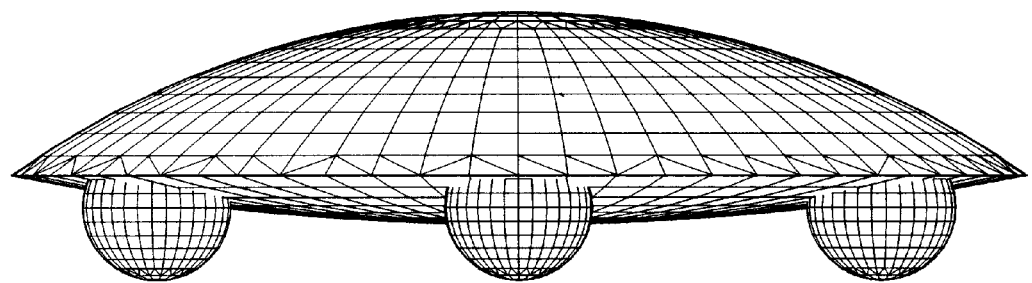
FIG. 2 is a diagrammatic side view of the spacecraft body of the airship/spacecraft shown in FIG. 1.
Figure 3:
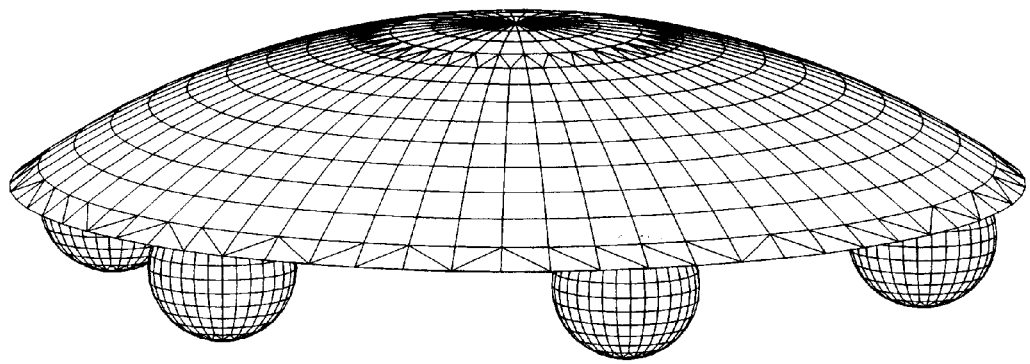
FIG. 3 is a diagrammatic perspective view from above of the spacecraft body shown in FIG. 2.
Figure 4:
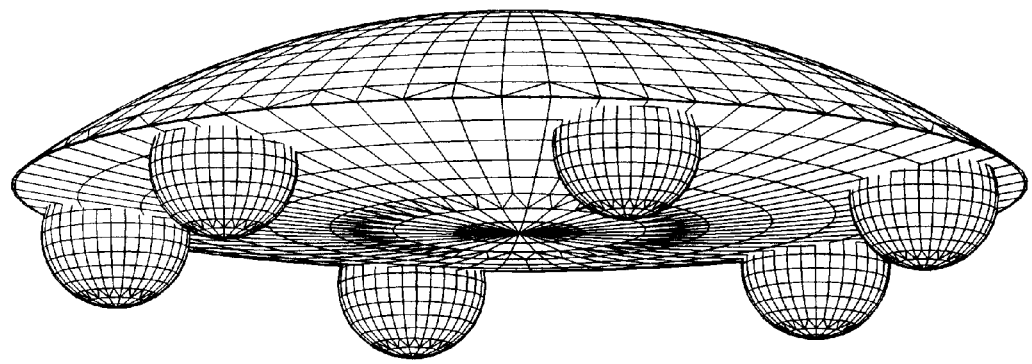
FIG. 4 is a diagrammatic perspective view from below of the spacecraft body shown in FIG. 2.
Figure 9:
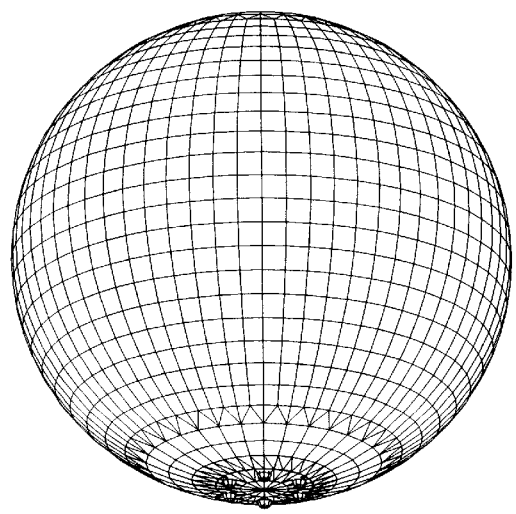
FIG. 9 is diagrammatic perspective view from below of an airship/spacecraft with a structurally integrated spacecraft body.
Figure 10:
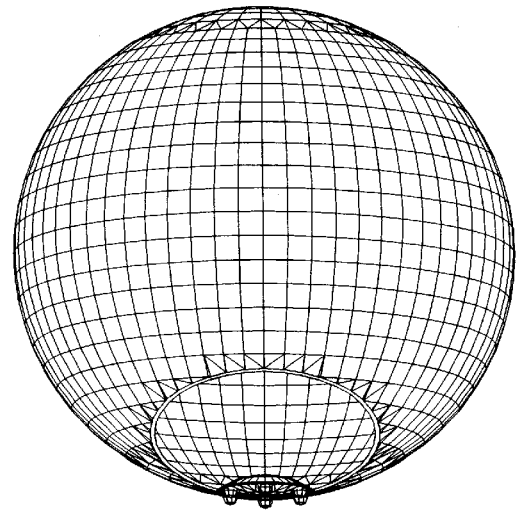
FIG. 10 is a diagrammatic perspective cutaway view from below of the airship/spacecraft shown in FIG. 9.
Figure 11:
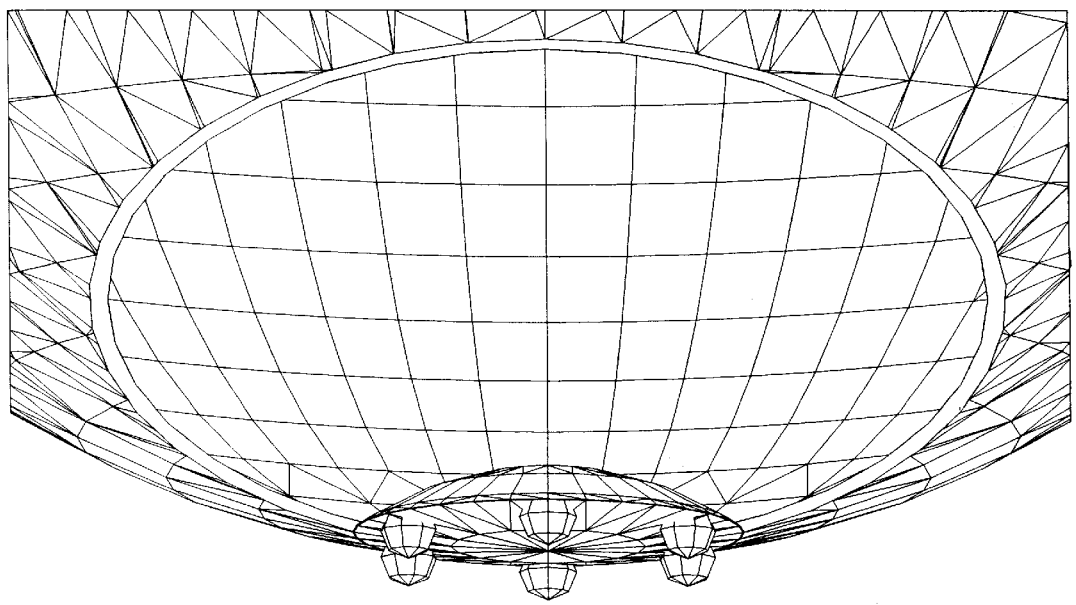
FIG. 11 is a fragmentary view of the region of cutaway shown in FIG. 10.
Figure 12:
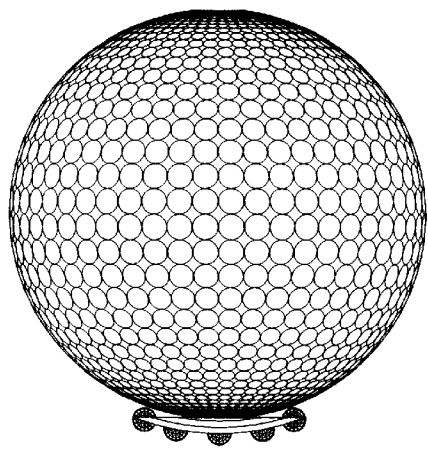
FIG. 12 is a diagrammatic side view of the airship/spacecraft with a gas retaining structure constructed of toroidal structural elements and with a spacecraft body designed for integration into a space structure.
Figure 14:
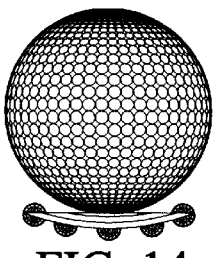
FIG. 14 is a diagrammatic side view of the airship/spacecraft shown in FIG. 12 with a contracted gas retaining structure.
Figure 13:
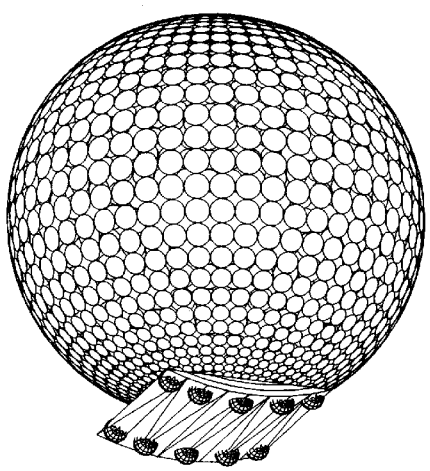
FIG. 13 is a diagrammatic perspective view from below of the airship/spacecraft shown in FIG. 12.
Figure 15:
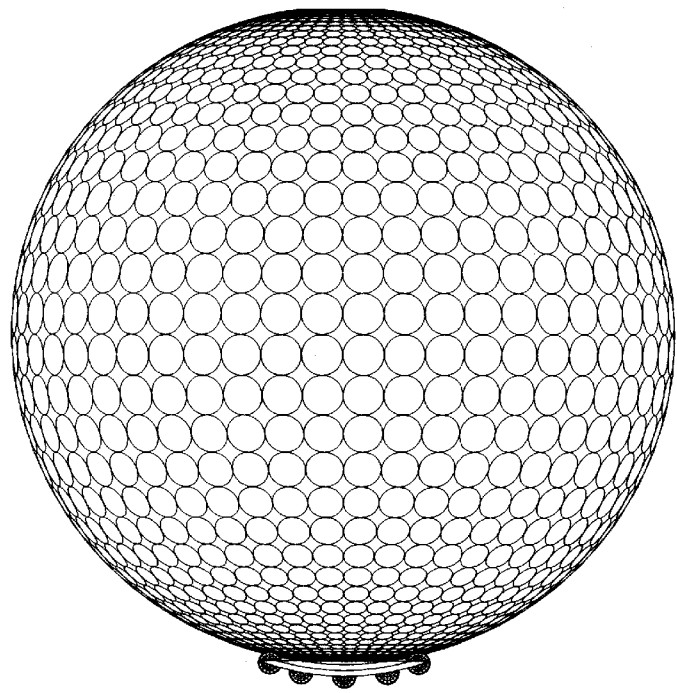
FIG. 15 is a diagrammatic side view of the airship/spacecraft shown in FIG. 12 with an expanded gas retaining structure.
Figure 16:
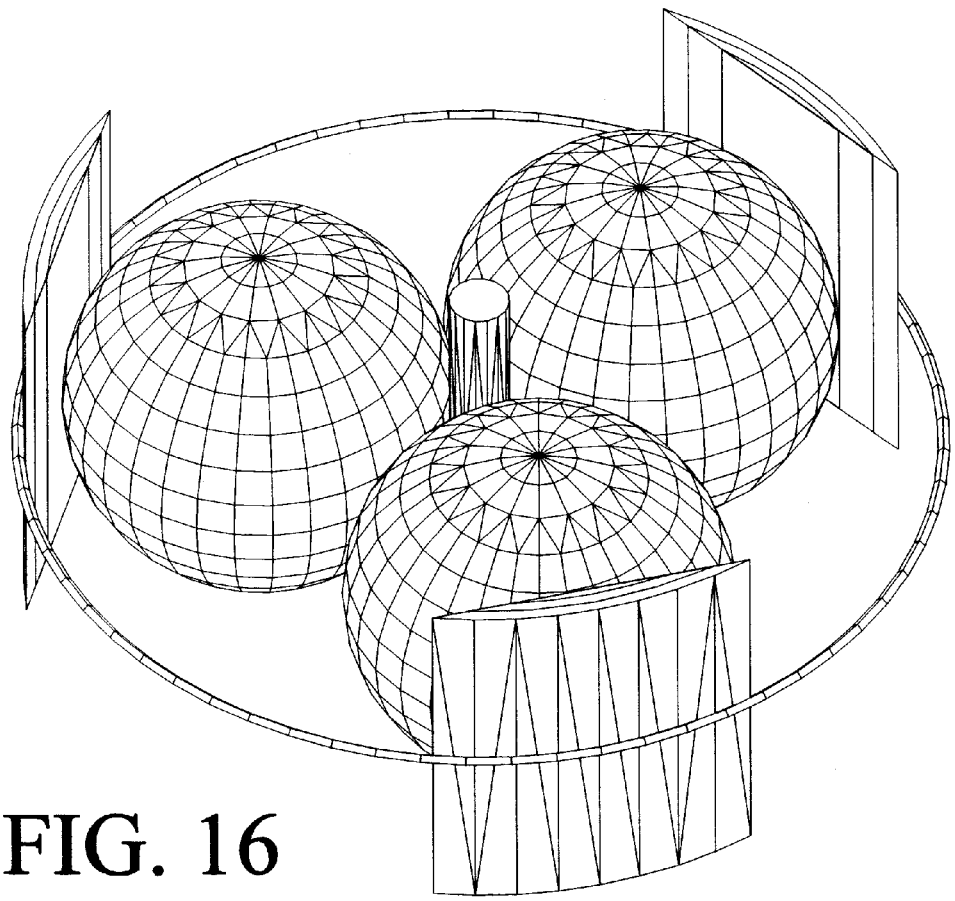
FIG. 16 is a diagrammatic perspective view from above of a space structure comprised of an array of three of the airship/spacecraft shown in FIG. 12.
Figure 17:
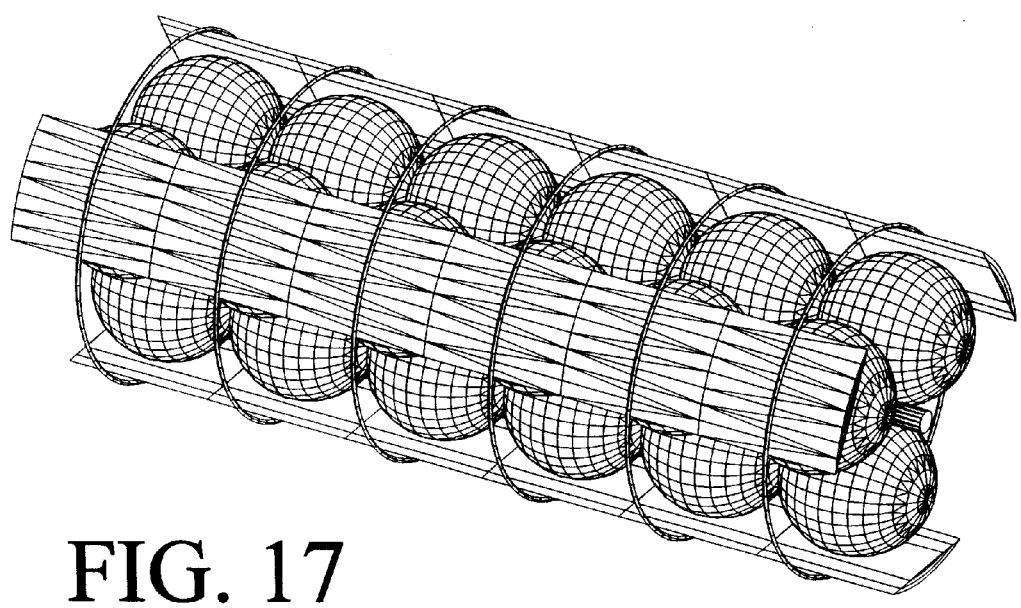
FIG. 17 is a diagrammatic perspective view of a space structure comprised of a linear array of six of the space structures shown in FIG. 16.
Figure 18:
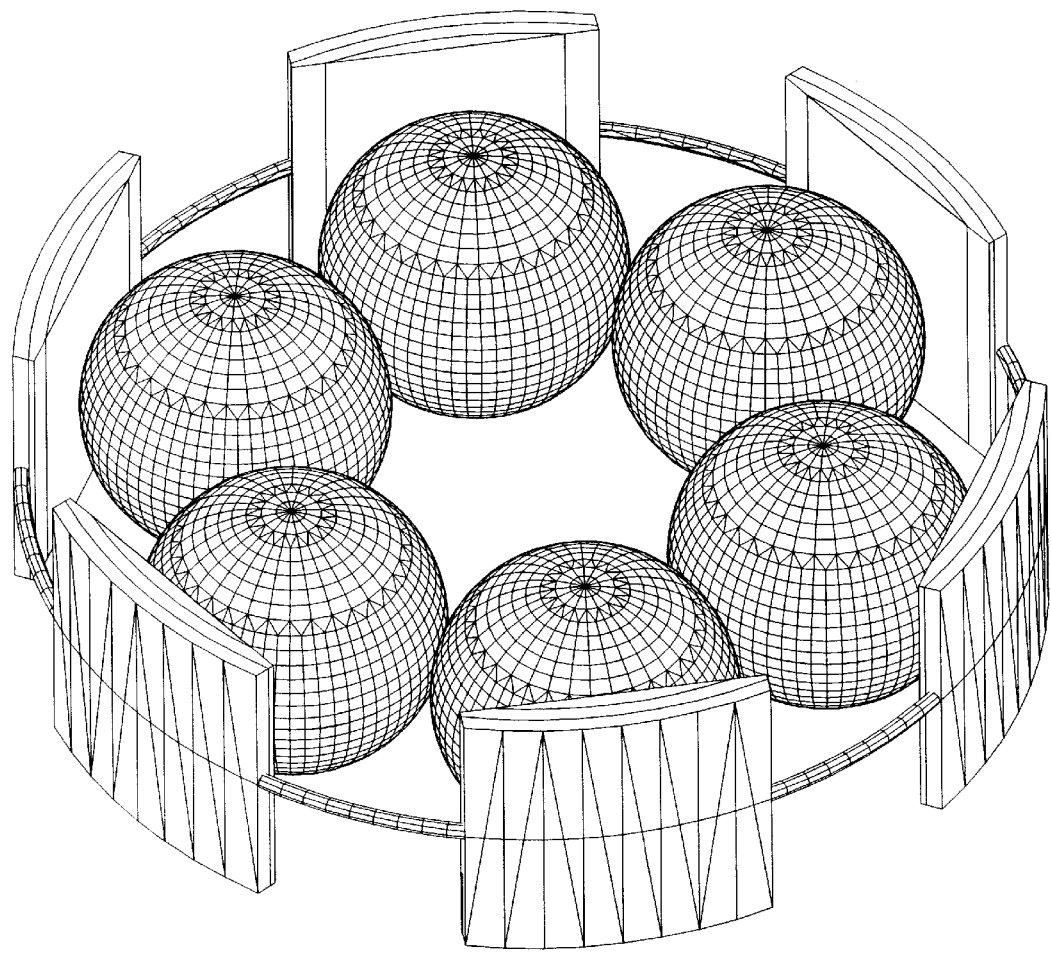
FIG. 18 is a diagrammatic perspective view from above of a space structure comprised of an array of six of the airship/spacecraft similar to that shown in FIG. 12.
Figure 19:
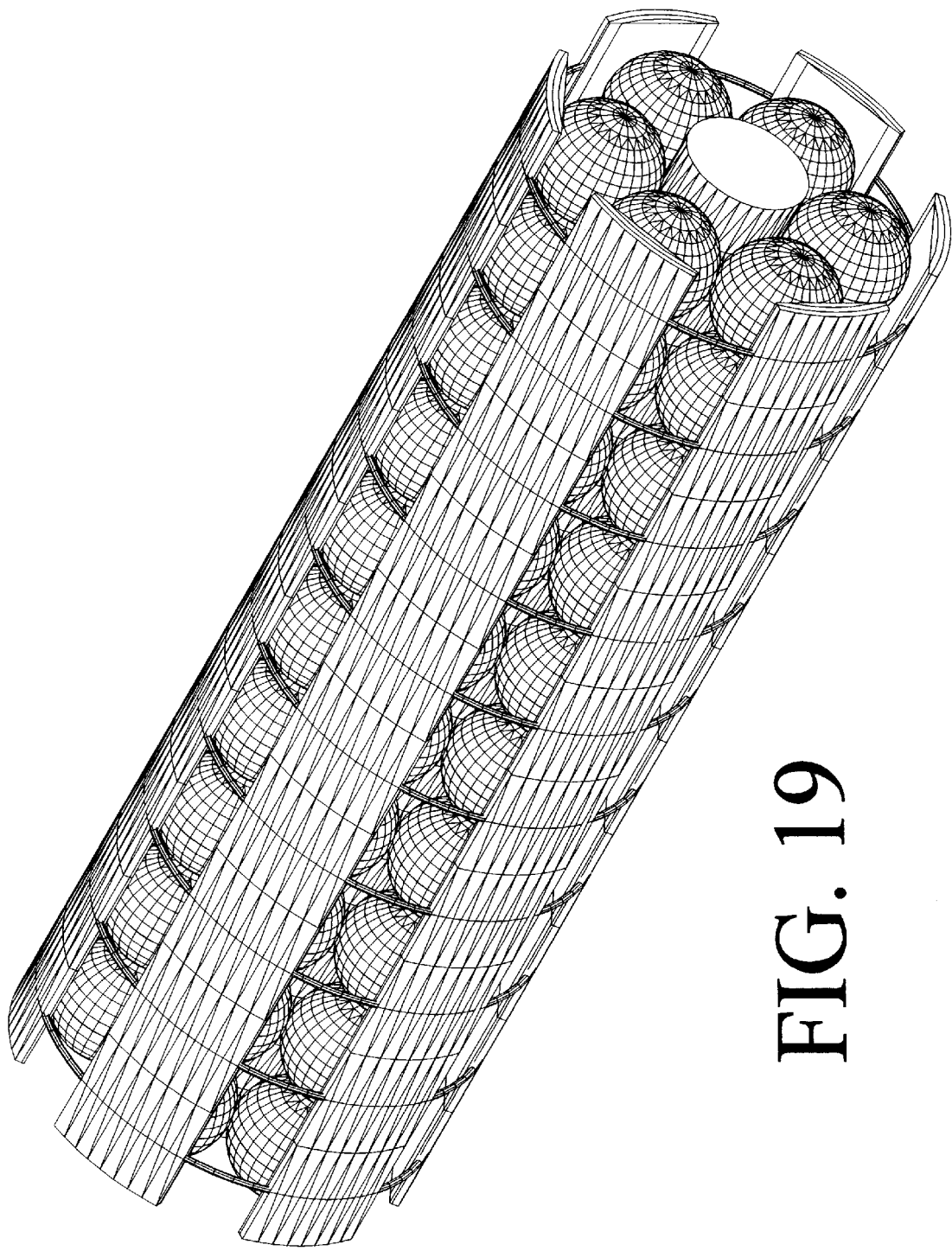
FIG. 19 is a diagrammatic perspective view of a space structure comprised of a linear array of ten of the space structures shown in FIG. 18.

The preferred embodiment places the thrusters on a structure which may include controls, machinery, tanks for fuel and/or oxidizer, and interior space for crew, passengers, cargo, or equipment, or all of them, which shall be hereinafter referred to as the spacecraft body. The spacecraft body may be separate from but connected to the gas retaining structure as shown in FIG. 1. An example of a spacecraft body, which is shown diagrammatically in FIGS. 1–4, has thrusters which are shown as spherical structures partially imbedded in the structure of the spacecraft body. Although the preferred embodiment separates the functions of the spacecraft body from the gas retaining structure, one or more functions of the spacecraft body can be integrated with a gas retaining structure. Indeed, the spacecraft body structure may even be a compartment of a gas retaining structure, as shown in FIGS. 9–11. The spacecraft body may include a fuel and oxidizer supply for thrusters, and may itself be a heavier-than-air lifting body, as shown in FIGS. 2–4, capable of gliding or powered flight. Control surfaces for aerodynamically controlling the spacecraft body in aerodynamic flight can be included for such operation.

One object of the invention is to provide an airship which has sufficient buoyancy to rise vertically to and beyond an altitude of neutral buoyancy in the region of the stratosphere/ionosphere and higher. If the region of the atmosphere at which the vehicle reaches neutral buoyancy has sufficient atmospheric oxidizer for the combustion of fuel in an atmospheric oxidizer compressing thruster, thrust from one or more such thrusters may be used to further the ascent of the airship. Where the atmospheric oxidizer compressing thrusters can not function because sufficient atmosphere cannot be compressed to provide atmospheric oxidizer for the combustion of fuel, thrusters which utilize stored oxidizer for oxidation of the fuel are used to further the ascent of the airship. During the application of thrust the flight path of the airship/spacecraft may be controlled by directing the thrust.

Up to the point of the application of thrust, and by reason of operation in an atmosphere of sufficient density to provide buoyancy, the airship/spacecraft is operated as an airship. However, when the effect of buoyancy is insignificant, the airship/spacecraft must be operated purely as a thruster powered spacecraft. The point of transition from operation as an airship depends in part on the altitude at which the airship reaches neutral buoyancy, which is the altitude at which the density of the lifting gas will no longer provide a buoyant force to contribute to the ascent of the airship. The altitude of neutral buoyancy may be controlled by the regulation of the density of the gas in gas retaining structures, either by venting to the atmosphere, rarefaction by pumping gas out, or by increasing the volume of gas retaining structures, as shown in the structural expansion from FIG. 12 to FIG. 15, or a combination of thereof. The preferred method of increasing the altitude at which neutral buoyancy occurs is by increasing the volume of gas retaining structures.

The gas retaining structure contemplated has the ability to withstand sustained internal and external overpressures. The preferred gas retaining structure is one constructed using one or both of the structural systems which are the subjects of U.S. patent application Ser. Nos. 09/276665 and 09/276666. Such gas retaining structures can also be constructed to have the capability of changing volume and shape while maintaining structural strength. Moreover, gas retaining structures so constructed have sufficient strength and size to include as components in the framework of permanent space platforms, space habitats, and spacecraft for space voyages. Thus, the gas retaining structure may also be used as the framework for centrifugal artificial gravity which can be generated by rotating circular arrays thereof.

The preferred lifting gas for the airship phase is diatomic hydrogen, which provides the greatest lift and is a commonly used rocket fuel. The lifting force of diatomic hydrogen in air at sea level, both being at standard temperature and pressure, is approximately 68 pounds per 1,000 cubic feet of hydrogen.

Figure 20:
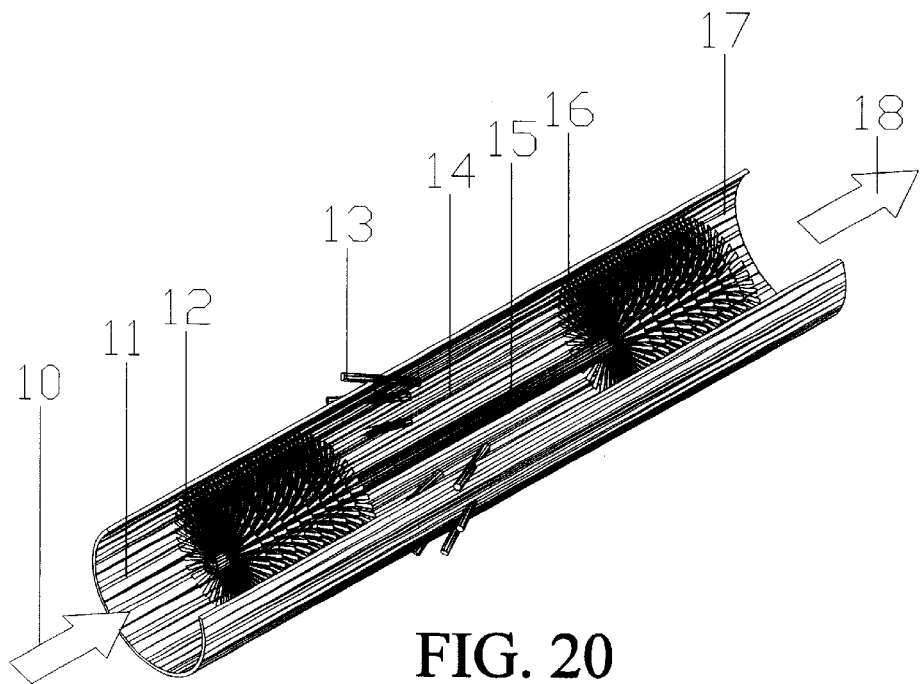
FIG. 20 is a diagrammatic perspective view of a thruster which operates by turbo-compression of hydrogen and combustion with injected oxidizer.

The ascent of the airship into space as a spacecraft is a result of its operation as a spacecraft under thruster power. With hydrogen as a lifting gas, hydrogen may be used as fuel at any time during the airship phase of the ascent. Secondary to being the lifting gas, hydrogen gas can fuel the thrusters in the transition from airship to spacecraft, and then fuel the spacecraft phase. As hydrogen is consumed by thrusters in the transition from airship to spacecraft, several effects occur which act to assist in the extension of the ascent of the airship: firstly, when hydrogen is pumped out to fuel the thrusters, with the volume of the involved gas retaining structure maintained, the density of the hydrogen in the gas retaining structure is reduced, resulting in the buoyant prolongation of the ascent; secondly, the total mass of the airship is reduced by the consumption of hydrogen consumed by the thrusters from the gas retaining structure, resulting in a lesser and lessening gravitational force on the airship, and thus a greater and increasing acceleration of the airship for a given strength of thrust; and, thirdly, when an atmospheric oxidizer is not available in sufficient quantity, consumption of stored oxidizer by the thrusters also reduces the overall mass of the airship and thus the effect of its weight countering its buoyancy. Together these effects contribute to the extension of the ascent of the airship.

Where hydrogen has been rarefied by an increase of the volume of a gas retaining structure in which it is contained, a form of turbo-rocket thruster may be used which can operate where no atmospheric oxidizer is available, an example of which is shown in FIGS. 20. Such a thruster intakes 11 and compresses 12 hydrogen 10 drawn from one or more gas retaining structures, or even the upper atmosphere, and sends it to a combustion chamber 14 mixed with an injected 13 oxidizer for ignition and burning; just as a turbojet intakes air for mixing with injected fuel for burning in a combustion chamber. The energetic products of combustion then flow through and power the turbine 16, which is connected to and powers the compressor 12 via a shaft 15 and/or transmission. The energetic exhaust gasses 18 then exit from the exhaust area 17 to the space outside the airship/spacecraft system to provide reaction thrust. The process of supplying hydrogen, or other lifting gas that may be used as fuel, to such a thruster may be assisted by electromagnetically accelerating the gas to the intake, pumping, including ultrasonic pumping, and pre-compression. Contracting the gas retaining structures is another means for assisting the extraction of gas from gas retaining structures for supplying fuel to the thrusters, such as the transition shown between FIGS. 12 and 14.

Figure 21:
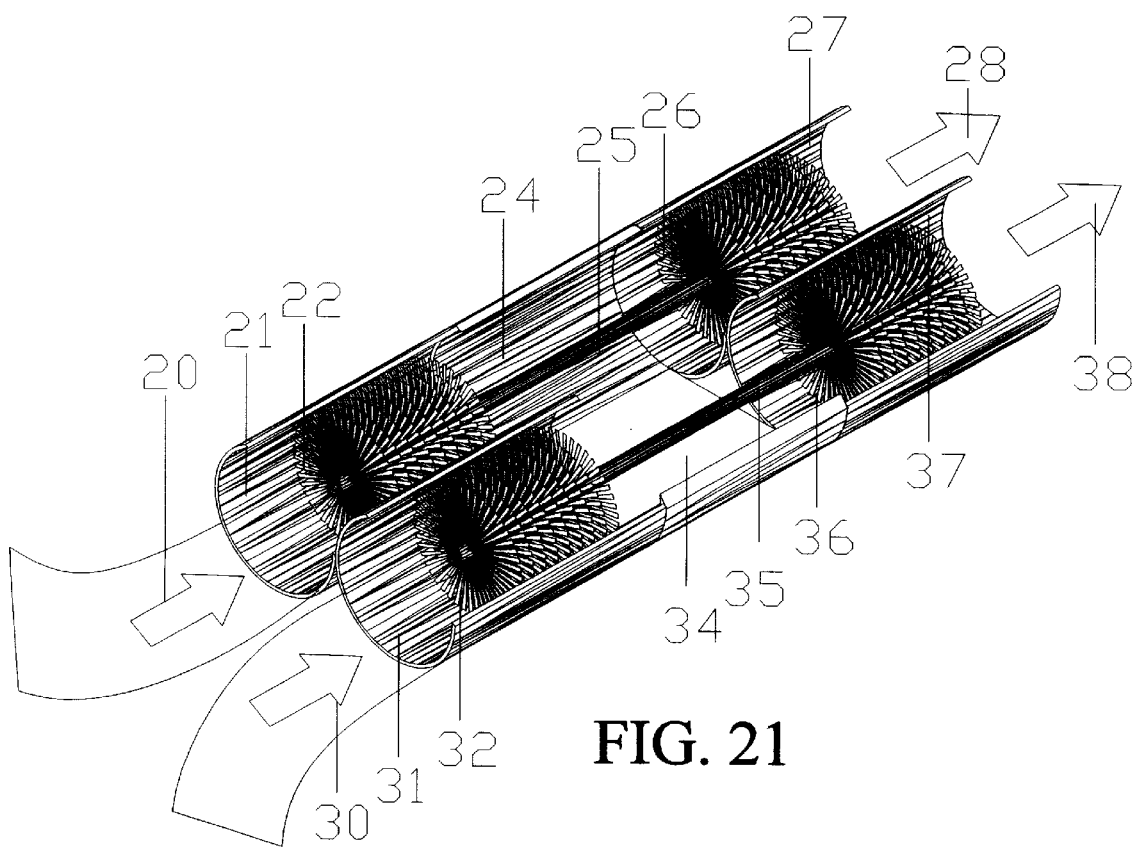
FIG. 21 is a diagrammatic perspective view of a dual thruster which operates by separate turbo-compression of hydrogen and atmospheric oxidizer and mixing for combustion.

Another type of thruster can operate where the hydrogen is rarefied in the gas retaining structures, but with a gaseous oxidizer, an example of which is shown in FIG. 21, in which a thruster as shown in FIG. 20 is combined with a thruster that intakes a gaseous oxidizer to form a dual thruster. The general configuration is similar to dual turbojets, but with a common combustion chamber. Such a thruster intakes 21 and compresses 22 fuel gas 20 drawn from one or more gas retaining structures with a first compressor 22, and sends it to a combustion chamber 24 where it is mixed with a gaseous oxidizer 30, which may be drawn from the atmosphere 31 and compressed 32 by a second compressor 32, for ignition and burning in the common combustion chamber 24, 34. The energetic products of combustion then flow through and power two turbines 26, 36, each of which are connected to and power the compressors 22, 32 via their respective shafts 25, 35 and/or transmissions. The energetic exhaust gasses 28, 38 then exit from the exhaust area 27, 37 to the space outside the airship/spacecraft system to provide reaction thrust.

Two configurations of such a dual thruster are possible: one of which is to provide injected oxidizer only to the hydrogen-intake side of the dual system with a means for mechanical division of the combustion chamber to isolate it from the atmosphere-intake side which may be used with injected fuel; the other is to provide injected oxidizer to both sides of the dual system shown in FIG. 21, with both sides intaking fuel gas. The operation of each side of such dual units could also be isolated from the other by one or more mechanical doors.

The above examples of thrusters, although integral to the operation of the present invention, are currently the subject of a separate application for a United States Patent by the present applicant, application Ser. No. 09/321,796, and will be a part of the disclosure presented in an application under the Patent Cooperation Treaty claiming priority from this application.

Conventional surface rocket launched and powered spacecraft are designed to make the thrust of the rocket engines as large as possible by ejecting mass as rapidly as possible and with the highest possible relative speed. A rapid consumption of fuel and oxidizer also reduces the mass of the rocket that is being accelerated, and thus the acceleration of the rocket is thus enhanced. In the launching of spacecraft from the surface of the earth rapid consumption of fuel is considered to be an advantage, provided that the spacecraft and its contents can survive and endure the extreme acceleration.

In the case of the present invention g-forces in the buoyant ascent through the atmosphere to space flight would be significantly moderated by the lack of the necessity for the rapid burn-off of weighty fuel during that phase of operation, inasmuch as activation of the thrusters is not necessary until after the airship has reached neutral buoyancy. The airship may have significant upward momentum at the point of neutral buoyancy, the airship having accelerated upward during buoyant ascent in overcoming gravitational force. The regulation of such acceleration of the airship/spacecraft during buoyant ascent by the regulation of the buoyancy is inherent in the airship aspect of the present invention. The reduction of the level of g-forces is also possible for the descent from space flight and can be accomplished with controlled deceleration by retrofiring of thrusters, rather than by uncontrolled atmospheric braking, so that the speed of the spacecraft is slowed to the extent that airship buoyancy will provide the braking for descent. Neutral buoyancy will occur at a higher altitude as a result of the lower density of the gases in one or more gas retaining structures. The gas retaining structures may contain hydrogen that was collected in space or unconsumed in the ascending flight, and thus available to fuel thrusters for further retrofiring. The gas retaining structures may also have hydrogen and atmospheric gases in separate compartments of one or more of gas retaining structures. The rest of the descent is then accomplished as an airship using the atmosphere as ballast by gradually increasing the density of gas within one or more gas retention structures.

While the invention has been disclosed in connection with a preferred embodiment, it will be understood that there is no intention to limit the invention to the particular embodiment shown, but it is intended to cover the various alternative and equivalent constructions included within the spirit and scope of the appended claims.

What I claim as my invention is:

1. An airship/spacecraft comprising:
   one or more gas retaining structures;
   a spacecraft body;
   a spacecraft body connected to one or more gas retaining structures;
   one or more lifting gasses;
   one or more thrusters fueled with a lifting gas; and
   a means of supplying a lifting gas from one or more gas retaining structures to one or more thrusters.

2. The airship/spacecraft of claim 1 wherein the gas retaining structures are torsion structures.

3. The airship/spacecraft of claim 1 further comprising a means for controlling the volume of one or more of the gas retaining structures.

4. The airship/spacecraft of claim 1 further comprising a means for controlling the density of the gas in one or more of the gas retaining structures.

5. The airship/spacecraft of claim 1 wherein the lifting gas is intaken and compressed by the thrusters that are fueled with lifting gas.

6. The airship/spacecraft of claim 1 further comprising one or more dual thrusters that separately intake and compress lifting gas and atmospheric oxidizer for combustion.

7. The airship/spacecraft of claim 1 wherein the spacecraft body has control surfaces for aerodynamically controlling the spacecraft body in atmospheric flight.

8. The airship/spacecraft of claim 1 further comprising a means for direction of the thrust of one or more of the thrusters.

9. A method for attaining orbit about the earth with an airship/spacecraft following launch from its moorings and jettison of ballast, comprising the steps of:
   (a) regulating the buoyancy of the gas retaining structures of the airship/spacecraft to control the ascent of the airship/spacecraft;
   (b) continuing the ascent of the airship/spacecraft with the application of thruster power;
   (c) decreasing the climb angle of the airship/spacecraft; and
   (d) increasing the tangential velocity of the airship/spacecraft to orbital velocity while decreasing the climb angle.

10. The method of claim 9 wherein step of regulating the buoyancy includes regulating the upward acceleration of the airship/spacecraft during buoyant ascent to maximize the altitude at which neutral buoyancy occurs.

11. The method of claim 9 wherein the step of regulating the buoyancy includes regulating the upward acceleration of the airship/spacecraft during buoyant ascent to maximize the momentum of the airship/spacecraft at neutral buoyancy.

12. The method of claim 9 wherein the step of regulating the buoyancy includes regulating the upward acceleration of the airship/spacecraft during buoyant ascent to minimize the acceleration experienced by the airship/spacecraft to the point of neutral buoyancy.

13. The method of claim 9 wherein the steps of regulating the buoyancy activating one or more thrusters, and continuing the ascent of the airship/spacecraft with the application of thruster power include maintaining vertical ascent of the airship/spacecraft through the atmosphere until atmospheric drag on the airship/spacecraft becomes insignificant.

14. The method of claim 9 wherein the steps of regulating the buoyancy, activating one or more thrusters, and continuing the ascent of the airship/spacecraft with the application of thruster power include maintaining the horizontal velocity imparted to the airship/spacecraft at launch due to the rotation of the earth during the ascent of the airship/spacecraft through the atmosphere until atmospheric drag on the airship/spacecraft becomes insignificant.

15. The method of claim 9 wherein the steps of activating one or more thrusters, continuing the ascent of the airship/spacecraft with the application of thruster power and increasing the tangential velocity include fueling thrusters with lifting gas.

16. The method of claim 9 wherein the step of increasing the tangential velocity includes adjusting the tangential velocity and climb angle of the airship/spacecraft for orbital injection at the chosen altitude.

17. The method of claim 9 wherein the step of continuing the ascent of the airship/spacecraft with the application of thruster power includes activating one or more thrusters of the airship/spacecraft at approximately the altitude of neutral buoyancy.

* * * * *